United States Patent
You et al.

(10) Patent No.: US 11,979,192 B2
(45) Date of Patent: May 7, 2024

(54) WIRELESS OPTICAL COMMUNICATION DATA TRANSMISSION APPARATUS AND METHOD

(71) Applicant: SOOCHOW UNIVERSITY, Suzhou (CN)

(72) Inventors: Xiaodi You, Suzhou (CN); Chaoran Xiong, Suzhou (CN); Zile Jiang, Suzhou (CN); Gangxiang Shen, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 33 days.

(21) Appl. No.: 17/801,296

(22) PCT Filed: Aug. 10, 2021

(86) PCT No.: PCT/CN2021/111697
§ 371 (c)(1),
(2) Date: Aug. 22, 2022

(87) PCT Pub. No.: WO2023/284047
PCT Pub. Date: Jan. 19, 2023

(65) Prior Publication Data
US 2023/0283381 A1 Sep. 7, 2023

(30) Foreign Application Priority Data

Jul. 15, 2021 (CN) .......................... 202110802528.0

(51) Int. Cl.
*H04B 10/54* (2013.01)
*H04B 10/291* (2013.01)

(52) U.S. Cl.
CPC ......... *H04B 10/541* (2013.01); *H04B 10/291* (2013.01)

(58) Field of Classification Search
CPC ............................. H04B 10/54; H04B 10/541
See application file for complete search history.

(56) References Cited

U.S. PATENT DOCUMENTS 5,237,441 A 8/1993 Nhu
5,548,434 A 8/1996 Shimonaka et al.
(Continued)

FOREIGN PATENT DOCUMENTS

CN 108667525 A 10/2018

*Primary Examiner* — Nathan M Cors
(74) *Attorney, Agent, or Firm* — SZDC Law PC

(57) ABSTRACT

The present invention provides a wireless optical communication data transmission apparatus and method, including a transmit module and a receive module, where the transmit module includes a transmission gate, and the transmit module is configured to convert serial data into multipath control signals to control the transmission gate to output an electrical signal, convert the electrical signal into an optical signal, and transmit the optical signal to the receive module; and the receive module includes a peak value detector and a comparator group, and the receive module is configured to convert the received optical signal into the electrical signal and output the serial data after threshold determination by the comparator group, where the peak value detector provides a reference voltage to the comparator group according to the received electrical signal, and the comparator group performs voltage division according to the reference voltage to determine a threshold.

10 Claims, 3 Drawing Sheets

(56) References Cited

U.S. PATENT DOCUMENTS

| | | | |
|---|---|---|---|
| 2016/0156417 A1* | 6/2016 | Tanaka | H04B 10/541 398/186 |
| 2018/0205464 A1* | 7/2018 | Broekaert | H04B 10/40 |
| 2018/0227162 A1* | 8/2018 | Tokuhiro | H04L 27/06 |
| 2020/0059301 A1* | 2/2020 | Hu | H04B 10/5057 |
| 2020/0252128 A1 | 8/2020 | Li et al. | |

\* cited by examiner

WIRELESS OPTICAL COMMUNICATION DATA TRANSMISSION APPARATUS AND METHOD

This application is the National Stage Application of PCT/CN2021/111697, filed on Aug. 10, 2021, which claims priority to Chinese Patent Application No. 202110802528.0, filed on Jul. 15, 2021, which is incorporated by reference for all purposes as if fully set forth herein.

FIELD OF THE INVENTION

The present invention relates to the field of optical communication, and specifically relates to a wireless optical communication data transmission apparatus and method.

DESCRIPTION OF THE RELATED ART

With the development of 5G and big data technologies, higher demand for network speed has arisen. In a mainstream non-return-to-zero (NRZ) modulation method nowadays, only one bit of information can be transmitted in one symbol cycle. Therefore, higher bandwidth is required to achieve higher communication rates. However, it is very difficult to enhance the bandwidth of existing optical devices. Therefore, multiple pulse-amplitude modulation (M-PAM) higher-order modulation method supports higher rates in optical interconnection. In fiber optic communication, PAM4 has been widely used, and there are relatively mature PAM4 optical modules. In wireless optical communication, due to the bandwidth limitation of light source lamps, a higher-order modulation method with high bandwidth utilization is more required. However, in wireless optical communication, there is currently no mature wireless optical module supporting M-PAM, which limits the rate of digital baseband transmission in wireless optical communication.

An existing visible light communication light source lamp for PAM modulation uses a serial-to-parallel converter to convert a serial input control signal into a parallel output signal, and light different quantities of lamp beads to transmit a PAM signal. However, in a driver circuit, different lamp beads are lit and extinguished with different delays, causing limitation to light source modulation bandwidths. As a result, such a transmitter is inappropriate for high-speed M-PAM communication. The light source lamp depends on the position and angle at which a receiver is located. If the angle and position of the receiver change, the received light intensity is not linearly proportional to a quantity of lit light beads, which increases the complexity of the receiver. There are also a clock data recovery circuit for a PAM4 receiver with a waveform screening function and a PAM4 receiver. A comparator and a phase discriminator form the body of the clock data recovery circuit. A reference threshold voltage of the comparator of the clock data recovery circuit is fixed. As a result, a receiving position of the clock data recovery circuit can only be fixed, and the clock data recovery circuit is susceptible to interference from external adjustment and cannot be adaptively adjusted.

SUMMARY OF THE INVENTION

An objective of the present invention is to provide a wireless optical communication data transmission apparatus and method, which can enhance the stability and mobility of wireless optical communication without being limited by a distance transmission environment and can improve bandwidth utilization through higher-order PAM.

To resolve the foregoing technical problems, the present invention provides a wireless optical communication data transmission apparatus, including a transmit module and a receive module, where the transmit module includes a transmission gate, and the transmit module is configured to convert serial data into multipath control signals to control the transmission gate to output an electrical signal, convert the electrical signal into an optical signal, and transmit the optical signal to the receive module; and the receive module includes a peak value detector and a comparator group, and the receive module is configured to convert the received optical signal into the electrical signal and output the serial data after threshold determination by the comparator group, where the peak value detector provides a reference voltage to the comparator group according to the received electrical signal, and the comparator group performs voltage division according to the reference voltage to determine a threshold.

As a further improvement of the present invention, the transmission gate is connected to a reference voltage circuit, the reference voltage circuit is connected to a power supply, the reference voltage circuit is configured to perform voltage division on the power supply to provide a reference voltage to the transmission gate, and the transmission gate is configured to output a reference voltage signal according to the plurality of paths of control signals.

As a further improvement to the present invention, the transmit module includes a serial-to-parallel converter and a decoder that are sequentially connected, the decoder is connected to the transmission gate, the serial-to-parallel converter is configured to convert the serial data into a parallel signal and transmit the parallel signal to the decoder, and the decoder is configured to output one path of control signal of strobe data to control the transmission gate to output the electrical signal.

As a further improvement to the present invention, the transmit module further includes a pulse shaping filter, a light source driving circuit, and a wireless optical communication light source that are sequentially connected, the pulse shaping filter is connected to the transmission gate, the pulse shaping filter is configured to perform pulse shaping on the electrical signal outputted by the transmission gate and output the pulse shaped electrical signal to the light source driving circuit, and the light source driving circuit is configured to drive the wireless optical communication light source to convert the electrical signal into the optical signal for transmission.

As a further improvement to the present invention, the receive module includes a photoelectric converter and a peak clipping filter that are sequentially connected, the peak clipping filter is separately connected to the peak value detector and the comparator group, the photoelectric converter is configured to convert the received optical signal into the electrical signal, and the peak clipping filter is configured to perform peak noise cancellation on the electrical signal and output the processed electrical signal to the peak value detector and the comparator group.

As a further improvement to the present invention, a low-pass filter is arranged between the peak value detector and the comparator, the peak value detector is connected to the comparator group by the low-pass filter, and the comparator group is configured to perform voltage division according to a reference voltage $V_{ref}$ provided, by the low-pass filter, where an $i^{th}$ level threshold is $V_{ref}/i$, and perform determination according to a relationship between the threshold and the electrical signal inputted in the peak clipping filter to output a parallel signal.

As a further improvement to the present invention, the output of the comparator group is connected to a parallel-to-serial converter, the parallel-to-serial converter is configured to convert the parallel signal into the serial data for output, the output of the parallel-to-serial converter is connected to an error detector, an output of the error detector is connected to the comparator group, and the error detector is configured to analyze an error component according to the serial data and adjust a determination threshold of the comparator group according to an analysis result.

A wireless optical communication data transmission method is provided, where the foregoing wireless optical communication data transmission apparatus is used to perform data transmission, and the method includes the following steps:

converting, by the transmit module, serial data into multipath control signals to control the transmission gate to output an electrical signal, converting the electrical signal into an optical signal, and transmitting the optical signal to the receive module; and converting, by the receive module, the received optical signal into the electrical signal, and outputting the serial data after threshold determination by the comparator group, where the peak value detector provides a reference voltage to the comparator group according to the received electrical signal, and the comparator group performs voltage division according to the reference voltage to determine a threshold.

As a further improvement to the present invention, the transmit module converts the serial data into $\log_2 M$ paths of parallel signals, the decoder outputs one path of M paths for strobing, the decoder controls a high-speed transmission gate to send one path of transmission reference voltage, the reference voltage is obtained by performing voltage division on the power supply, a voltage of the power supply is $V_{cc}$, when $$i < \frac{M}{2},$$

a voltage sent by an $i^{th}$ path of transmission gate is $$\frac{i-M+1}{M-1}V_{cc},$$

and when $$i > \frac{M}{2},$$

the voltage sent by the $i^{th}$ path of transmission gate is $$\frac{i-M/2}{M-1}V_{cc}.$$

As a further improvement to the present invention, the serial data outputted after the threshold determination by the comparator group in the receive module is connected to the error detector, the error detector detects the error rates of M symbols, and if an error rate corresponding to an $i^{th}$ symbol exceeds 2/M of an error ratio, the difference between two adjacent determination thresholds of the $i^{th}$ symbol is increased to adjust a determination threshold of the comparator.

The beneficial effects of the present invention are as follows: In the present invention, the transmission gate is used to perform high-speed low-delay M-PAM signal transmission, so that the bandwidth is efficiently utilized, and the system complexity is low. In addition, the peak value detector and the comparator group are used to dynamically adjust a determination threshold, so that the impact of a communication distance and a communication position on communication in wireless optical communication can be reduced, and the disadvantage that only fixed-point communication is allowed in wireless optical communication can be overcome, thereby improving the position flexibility of a transmit end and a receive end.

DETAILED DESCRIPTION OF THE PREFERRED EMBODIMENTS

The present invention is further described below with reference to the accompanying drawings and specific embodiments, to enable a person skilled in the art to better understand and implement the present invention. However, the embodiments are not used to limit the present invention.

Embodiment 1

Figure 1:
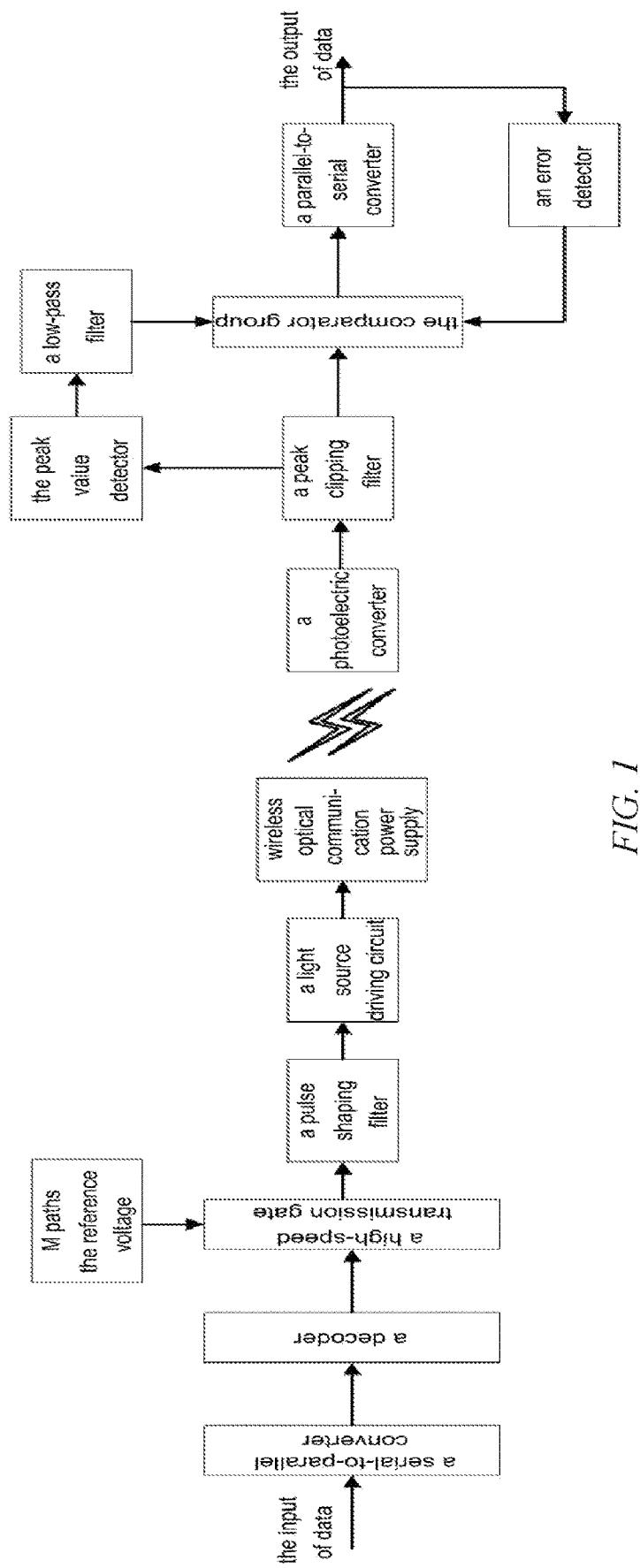
FIG. 1 is a schematic structural diagram of the principle of the present invention.

Referring to FIG. 1, this embodiment of the present invention provides a wireless optical communication data transmission apparatus, including a transmit module and a receive module, where the transmit module includes a transmission gate, and the transmit module is configured to convert serial data into multipath control signals to control the transmission gate to output an electrical signal, convert the electrical signal into an optical signal, and transmit the optical signal to the receive module; and the receive module includes a peak value detector and a comparator group, and the receive module is configured to convert the received optical signal into the electrical signal and output the serial data after threshold determination by the comparator group, where the peak value detector provides a reference voltage to the comparator group according to the received electrical signal, and the comparator group performs voltage division according to the reference voltage to determine a threshold.

Specifically, the transmit module: an input of the serial data is connected to a serial-to-parallel converter, and is converted into $\log_2 M$ paths of parallel signals; the parallel signals outputted by the serial-to-parallel converter are connected to a decoder, so that the decoder outputs one path of M paths for strobing; the output of the decoder is connected to a high-speed transmission gate, the high-speed transmission gate is controlled to send one path of transmission reference voltage, the reference voltage is obtained by performing voltage division on the power supply, if $$i < \frac{M}{2},$$

a voltage sent by an $i^{th}$ path of transmission gate is $$\frac{i-M+1}{M-1}V_{cc},$$

and when $$i > \frac{M}{2},$$

the voltage sent by the $i^{th}$ path of transmission gate is $$\frac{i-M/2}{M-1}V_{cc};$$

the signal outputted by the high-speed transmission gate is connected to a pulse shaping filter, the pulse shaping filter shapes an inputted pulse signal, to cancel inter-symbol crosstalk; and an output of the pulse shaping filter is connected to a light source driving circuit, and the light source driving circuit converts the electrical signal into the optical signal;

the receive module: a photoelectric converter converts the received optical signal into the electrical signal; an output of the photoelectric converter is connected to a peak clipping filter to perform peak noise cancellation, to ensure that the peak value detector detects an actual peak value of the received signal; an output of the peak clipping filter is connected to the peak value detector and the comparator, and the peak value detector is connected to the comparator by a low-pass filter, to provide a reference voltage to the comparator group; the comparator performs voltage division according to a reference voltage $V_{ref}$ provided by the low-pass filter to obtain a threshold as the comparator group, and an $i^{th}$ level threshold is $V_{ref}/i$; the comparator performs determination according to a relationship between the inputted signal and the threshold to output M paths of parallel signals; the output of the comparator group is connected to a parallel-to-serial converter, and is converted into the serial data for output; the output of the parallel-to-serial converter is connected to an error detector, to analyze an error component; and an output of the error detector is connected to the comparator group, and a determination threshold of the comparator is adjusted according to error analysis.

In the apparatus, the transmission gate is used to perform high-speed low-delay M-PAM signal transmission. In addition, a method of using the peak value detector and the comparator group to dynamically adjust a determination threshold is used, so that the impact of a communication distance and a communication position on communication in wireless optical communication can be reduced, and the disadvantage that only fixed-point communication is allowed in wireless optical communication can be overcome. The present invention can improve the position flexibility of a transmit end and a receive end.

Embodiment 2

Figure 2:
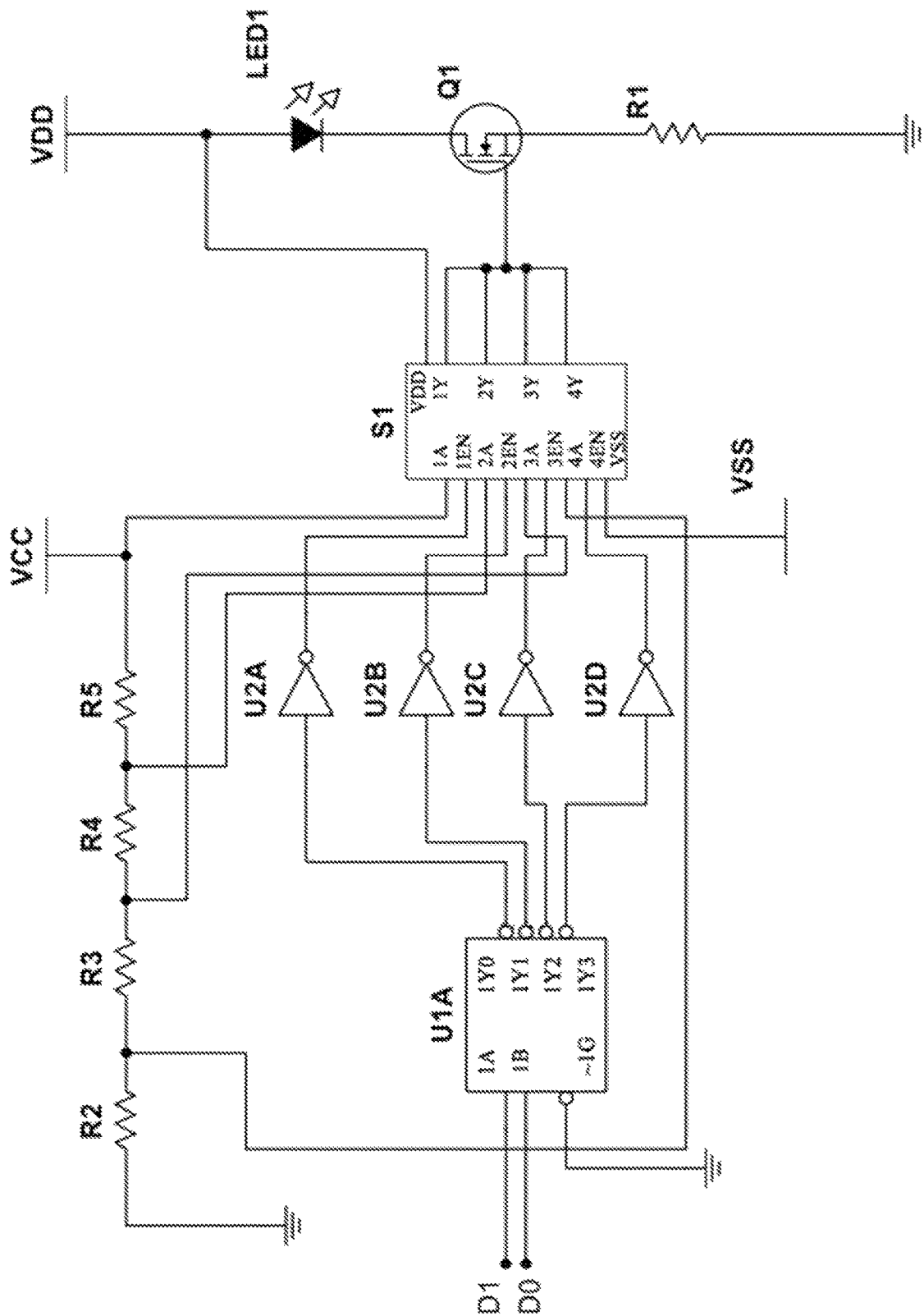
FIG. 2 is a schematic diagram of the implementation of a core circuit of a transmit module according to the present invention.

Referring to FIG. 1 and FIG. 2, this embodiment of the present invention provides a wireless optical communication data transmission apparatus. Based on Embodiment 1, the circuit of the transmit module is designed. As shown in FIG. 2, U1A is a 2-4 decoder. U2A, U2B, U2C, and U2D are four inverters. S1 is a 4-path transmission gate. Q1 is a driving MOS transistor. R1 is a current-limiting resistor. A light source 1 is a light-emitting diode. The input of the serial data and the serial-to-parallel converter may be implemented by a constituent timing circuit in an FPGA, to eventually output two paths of parallel digital signals D1 and D0. After the signals pass through the decoder U1A, a corresponding voltage in the transmission gate is strobed to the driving transistor Q1. The driving transistor Q1 provides a driving current to the light source LED1. A reference voltage of the transmission gate is provided by a power supply $V_{CC}$ through voltage division by resistors R2, R3, R4, and R5. 74HC4066 may be chosen for the transmission gate. The high-speed switching characteristic of the transmission gate is used. A jump of an output voltage may be completed as soon as an inputted control signal of data is changed. The input of the inputted control signal is directly controlled by the decoder, and then the transmission gate outputs the jump at a high speed, to complete high-speed low-delay M-PAM data communication, thereby efficiently utilizing the bandwidth and enhancing the stability of wireless optical communication.

Embodiment 3

Figure 3:
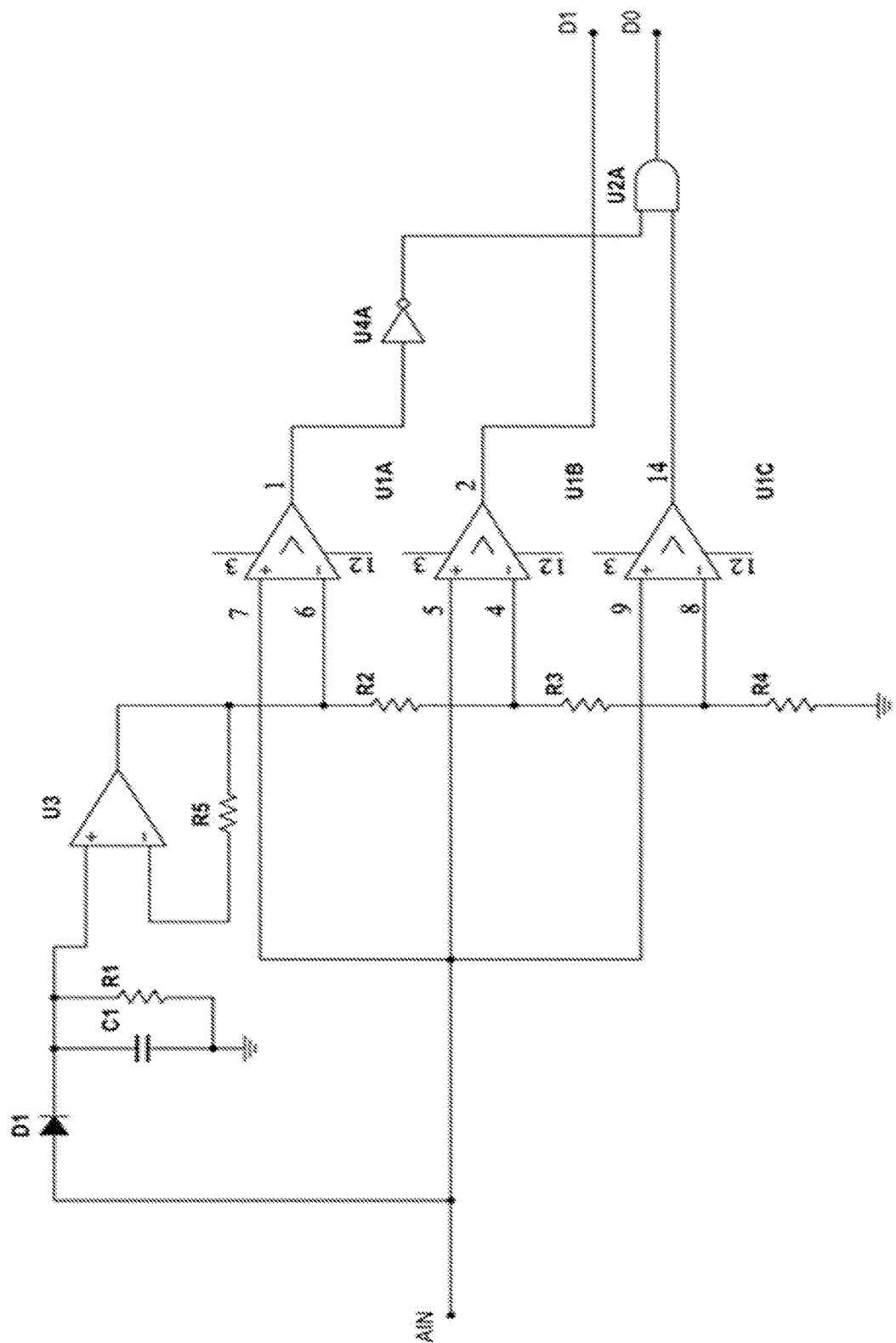
FIG. 3 is a schematic diagram of the implementation of a core circuit of a receive module according to the present invention.

Referring to FIG. 1 and FIG. 3, this embodiment of the present invention provides a wireless optical communication data transmission apparatus. Based on Embodiment 1, the circuit of the receive module is designed. As shown in FIG. 3, AIN is an electrical signal that passes through the peak clipping filter. U1A, U1B, and U1C form the comparator group. D1, C1, and R1 form a peak detection circuit. A threshold is provided to the comparator group through an operational amplifier U3 and the voltage division of R2, R3, and R4. U4A and U2A output two parallel paths of digital signals D1 and D0 according to a comparison result. The digital signals are sent to a subsequent timing circuit for parallel-to-serial conversion. A method of using the peak value detector and the comparator group to dynamically adjust a determination threshold is used, so that the impact of a communication distance and a communication position on communication in wireless optical communication can be reduced, thereby improving the position flexibility of a transmit end and a receive end.

Embodiment 4

Referring to FIG. 1, this embodiment of the present invention provides a wireless optical communication data transmission method is provided, where the wireless optical communication data transmission apparatus in Embodiment 1 is used to perform data transmission, and the method includes the following steps:

converting, by the transmit module, serial data into multipath control signals to control the transmission gate to output an electrical signal, converting the electrical signal into an optical signal, and transmitting the optical signal to the receive module; and converting, by the receive module, the received optical signal into the electrical signal, and outputting the serial data after threshold determination by the comparator group, where the peak value detector provides a reference voltage to the comparator group according to the received electrical signal, and the comparator group performs voltage division according to the reference voltage to determine a threshold.

Preferably, the transmit module converts the serial data into $\log_2 M$ paths of parallel signals, the decoder outputs one path of M paths for strobing, the decoder controls a high-speed transmission gate to send one path of transmission reference voltage, the reference voltage is obtained by performing voltage division on the power supply, a voltage of the power supply is $V_{cc}$, when $$i < \frac{M}{2},$$

a voltage sent by an $i^{th}$ path of transmission gate is $$\frac{i-M+1}{M-1}V_{cc},$$

and when $$i > \frac{M}{2},$$

the voltage sent by the $i^{th}$ path of transmission gate is $$\frac{i-M/2}{M-1}V_{cc}.$$

Preferably, the serial data outputted after the threshold determination by the comparator group in the receive module is connected to the error detector, the error detector detects the error rate of M symbols, and if an error rate corresponding to an $i^{th}$ symbol exceeds 2/M of an error ratio, the difference between two adjacent determination thresholds of the $i^{th}$ symbol is increased to adjust a determination threshold of the comparator. Through error analysis, the threshold value is adjusted to make reception and determination more reliable.

The foregoing embodiments are merely preferred embodiments used to fully describe the present invention, and the protection scope of the present invention is not limited thereto. Equivalent replacements or variations made by a person skilled in the art to the present invention all fall within the protection scope of the present invention. The protection scope of the present invention is as defined in the claims.

What is claimed is:

1. A wireless optical communication data transmission apparatus, comprising a transmit module and a receive module, wherein the transmit module comprises a transmission gate, and the transmit module is configured to convert serial data into multipath control signals to control the transmission gate to output electrical signals, convert the electrical signals into an optical signal, and transmit the optical signal to the receive module; and the receive module comprises a peak value detector and a comparator group, and the receive module is configured to convert the received optical signal into the electrical signals and output the serial data after threshold determination by the comparator group, wherein the peak value detector provides reference voltages to the comparator group according to the received electrical signals, and the comparator group performs voltage division according to the reference voltages to determine thresholds.

2. The wireless optical communication data transmission apparatus according to claim 1, wherein the transmission gate is connected to a reference voltage circuit, the reference voltage circuit is connected to a power supply, the reference voltage circuit is configured to perform voltage division on the power supply to provide reference voltages to the transmission gate, and the transmission gate is configured to output a reference voltage signal according to the plurality of paths of control signals.

3. The wireless optical communication data transmission apparatus according to claim 1, wherein the transmit module comprises a serial-to-parallel converter and a decoder that are sequentially connected, the decoder is connected to the transmission gate, the serial-to-parallel converter is configured to convert the serial data into parallel signals and transmit the parallel signals to the decoder, and the decoder is configured to output paths of control signal of strobe data to control the transmission gate to output the electrical signals.

4. The wireless optical communication data transmission apparatus according to claim 3, wherein the transmit module further comprises a pulse shaping filter, a light source driving circuit, and a wireless optical communication light source that are sequentially connected, the pulse shaping filter is connected to the transmission gate, the pulse shaping filter is configured to perform pulse shaping on the electrical signals outputted by the transmission gate and output the pulse shaped electrical signals to the light source driving circuit, and the light source driving circuit is configured to drive the wireless optical communication light source to convert the electrical signals into the optical signal for transmission.

5. The wireless optical communication data transmission apparatus according to claim 1, wherein the receive module comprises a photoelectric converter and a peak clipping filter that are sequentially connected, the peak clipping filter is connected to the peak value detector and the comparator group respectively, the photoelectric converter is configured to convert the received optical signal into the electrical signals, and the peak clipping filter is configured to perform peak noise cancellation on the electrical signals and output the processed electrical signals to the peak value detector and the comparator group.

6. The wireless optical communication data transmission apparatus according to claim 5, wherein a low-pass filter is arranged between the peak value detector and the comparator group, the peak value detector is connected to the comparator group by the low-pass filter, and the comparator group is configured to perform voltage division according to a reference voltage $V_{ref}$ provided by the low-pass filter, wherein an $i^{th}$ level threshold is $v_{ref}/i$, and perform determination according to a relationship between the thresholds and the electrical signals outputted from the peak clipping filter to output parallel signals.

7. The wireless optical communication data transmission apparatus according to claim 1, wherein outputs of the comparator group are connected to a parallel-to-serial converter, the parallel-to-serial converter is configured to convert parallel signals into the serial data for output, the output of the parallel-to-serial converter is connected to an error detector, an output of the error detector is connected to the comparator group, and the error detector is configured to analyze an error component according to the serial data and adjust the thresholds of the comparator group according to an analysis result.

8. A wireless optical communication data transmission method, wherein the wireless optical communication data transmission apparatus according to claim 1 is used to perform data transmission, and the method comprises steps of:
- converting, by the transmit module, serial data into multipath control signals to control the transmission gate to output electrical signals, converting the electrical signals into an optical signal, and transmitting the optical signal to the receive module; and
- converting, by the receive module, the received optical signal into the electrical signals, and outputting the serial data after threshold determination by the comparator group, wherein the peak value detector provides reference voltages to the comparator group according to the received electrical signals, and the comparator group performs voltage division according to the reference voltages to determine thresholds.

9. The wireless optical communication data transmission method according to claim 8, wherein the transmit module comprises a serial-to-parallel converter and a decoder that are sequentially connected, the transmit module converts the serial data into $\log_2 M$ paths of parallel signals, the decoder outputs one path of M paths for strobing, the decoder controls the transmission gate to send paths of the reference voltages, the reference voltages are obtained by performing voltage division on the power supply, a voltage of the power supply is $V_{cc}$, when $$i < \frac{M}{2},$$

a voltage sent by an $i^{th}$ path of the transmission gate is $$\frac{i - M + 1}{M - 1} V_{cc},$$

and when $$i > \frac{M}{2},$$

the voltage sent by the $i^{th}$ path of the transmission gate is $$\frac{i - M/2}{M - 1} V_{cc}.$$

10. The wireless optical communication data transmission method according to claim 8, wherein the serial data outputted after the threshold determination by the comparator group in the receive module is connected to an error detector, the error detector detects the error rates of M symbols, and if an error rate corresponding to an $i^{th}$ symbol exceeds 2/M of an error ratio, the difference between two adjacent determination thresholds of the $i^{th}$ symbol is increased to adjust the thresholds of the comparator.

* * * * *